(12) United States Patent
Seibert et al.

(10) Patent No.: US 12,224,612 B2
(45) Date of Patent: Feb. 11, 2025

(54) METHOD FOR CHARGING BATTERY PACKS FOR POWER TOOLS AND CHARGING DEVICE FOR CARRYING OUT THE METHOD

(71) Applicant: Robert Bosch GmbH, Stuttgart (DE)

(72) Inventors: Marc-Alexandre Seibert, Stuttgart (DE); Thomas Gabriel, Kirchheim-Jesingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 680 days.

(21) Appl. No.: 17/253,403

(22) PCT Filed: May 29, 2019

(86) PCT No.: PCT/EP2019/063916
§ 371 (c)(1),
(2) Date: Dec. 17, 2020

(87) PCT Pub. No.: WO2020/001907
PCT Pub. Date: Jan. 2, 2020

(65) Prior Publication Data
US 2021/0273474 A1 Sep. 2, 2021

(30) Foreign Application Priority Data

Jun. 27, 2018 (DE) .......................... 102018210524.3

(51) Int. Cl.
*H02J 7/00* (2006.01)
*H01M 10/46* (2006.01)
(Continued)

(52) U.S. Cl.
CPC ........... *H02J 7/0069* (2020.01); *H01M 10/46* (2013.01); *H01M 10/488* (2013.01); *H02J 7/007* (2013.01);
(Continued)

(58) Field of Classification Search
CPC ...... H02J 7/0069; H02J 7/007; H02J 7/00716; H01M 10/46; H01M 10/488; H01M 50/213; H01M 10/441; Y02E 60/10
(Continued)

(56) References Cited

U.S. PATENT DOCUMENTS 3,848,173 A * 11/1974 Hase ..................... H02J 7/0071
320/DIG. 22
4,443,752 A * 4/1984 Newman ........... H02J 7/007182
320/152
(Continued)

FOREIGN PATENT DOCUMENTS

CN 201289888 Y * 8/2009 ........ H01M 10/0525
CN 101689762 A 3/2010
(Continued)

OTHER PUBLICATIONS

International Search Report for PCT/EP2019/063916, Issued Aug. 27, 2019.
(Continued)

*Primary Examiner* — M Baye Diao
(74) *Attorney, Agent, or Firm* — NORTON ROSE FULBRIGHT US LLP; Gerard A. Messina

(57) ABSTRACT

A method for charging battery packs for power tools with the aid of a charging device. The charging device has a first charging mode, in which the battery packs are charged up to a defined state of charge using a constant current and subsequently using a constant voltage. At least one second charging mode is settable by a user, in which the battery packs are only partially charged up to a charge limit exclusively using a constant current. A charging device is also described.

14 Claims, 4 Drawing Sheets

(51) Int. Cl.
  *H01M 10/48* (2006.01)
  *H01M 50/213* (2021.01)
(52) U.S. Cl.
  CPC ....... *H02J 7/00716* (2020.01); *H01M 50/213* (2021.01)
(58) Field of Classification Search
  USPC ........................................................ 320/160
  See application file for complete search history.

(56) References Cited

U.S. PATENT DOCUMENTS

| | | | | |
|---|---|---|---|---|
| 5,172,044 | A * | 12/1992 | Sasaki | H02J 7/00714 320/160 |
| 5,696,435 | A * | 12/1997 | Koenck | H02J 7/0047 320/152 |
| 6,166,521 | A * | 12/2000 | Mercer | H02J 7/342 320/125 |
| 6,333,619 | B1 * | 12/2001 | Chavez | H02J 7/0069 320/160 |
| 7,688,028 | B2 * | 3/2010 | Phillips | H01M 50/247 320/134 |
| 8,421,381 | B2 * | 4/2013 | Fukatsu | B60L 53/24 324/426 |
| 8,643,342 | B2 * | 2/2014 | Mehta | H02J 7/0071 320/160 |
| 8,706,272 | B2 * | 4/2014 | Lindahl | G10L 19/20 369/7 |
| 9,136,716 | B2 * | 9/2015 | White | H02J 7/0016 |
| 9,142,992 | B2 * | 9/2015 | Malackowski | H02J 7/00714 |
| 9,190,863 | B2 * | 11/2015 | Park | H02J 7/007 |
| 9,365,174 | B2 * | 6/2016 | Graham | H02J 7/342 |
| 9,406,915 | B2 * | 8/2016 | White | H02P 29/0241 |
| 9,705,332 | B2 * | 7/2017 | Oudalov | H02J 3/32 |
| 9,793,583 | B2 * | 10/2017 | Johnson | H01M 50/213 |
| 10,158,117 | B2 * | 12/2018 | Ito | H01M 4/366 |
| 10,186,887 | B2 * | 1/2019 | Wang | B60L 58/12 |
| 10,868,428 | B2 * | 12/2020 | Stickel | H01M 10/44 |
| 11,192,230 | B2 * | 12/2021 | Bakker | H01M 50/269 |
| 11,522,381 | B2 * | 12/2022 | Deng | H01M 10/441 |
| 2006/0012338 | A1 * | 1/2006 | Etzold | H02J 7/0071 320/125 |
| 2007/0075678 | A1 | 4/2007 | Ng et al. | |
| 2009/0289603 | A1 * | 11/2009 | Mahowald | H02J 7/0069 320/160 |
| 2010/0237831 | A1 * | 9/2010 | Osswald | H02J 7/0069 320/134 |
| 2011/0057624 | A1 * | 3/2011 | Rizzo | H02J 7/0069 320/152 |
| 2011/0156661 | A1 | 6/2011 | Mehta et al. | |
| 2014/0015320 | A1 * | 1/2014 | Takano | H02J 7/04 307/38 |
| 2015/0171644 | A1 * | 6/2015 | Paryani | H02J 7/007184 320/137 |
| 2016/0023563 | A1 * | 1/2016 | Wang | B60L 58/24 320/152 |
| 2016/0308376 | A1 * | 10/2016 | Sorhage | H02J 7/0069 |
| 2016/0359339 | A1 | 12/2016 | Hwang et al. | |
| 2017/0302095 | A1 | 10/2017 | Flynn, Jr. et al. | |

FOREIGN PATENT DOCUMENTS

| | | | | |
|---|---|---|---|---|
| CN | 101404346 | B * | 12/2010 | ............ Y02E 60/10 |
| CN | 102255347 | A * | 11/2011 | ............ B60L 53/11 |
| CN | 202260588 | U * | 5/2012 | ............... H02J 7/10 |
| CN | 107681713 | A * | 2/2018 | ........... H01M 10/44 |
| JP | 2016111908 | A * | 6/2016 | ............ Y02E 60/10 |
| WO | 2011018335 | A2 | 2/2011 | |
| WO | 2012069690 | A1 | 5/2012 | |
| WO | 2016054359 | A1 | 4/2016 | |

OTHER PUBLICATIONS

Conrad Electronic CE Basetech—Important Informations—Multifunctional Charger 80 AC/DC Item No. 1484096, 2016, pp. 1-3. https://asset.conrad.com/media10/add/160267/c1/-/en/001484096ML03/001484096ML03.pdf Downloaded Dec. 16, 2020.
Youtube-Video "Core Swx Fleet Battery Chargers @ NAB2018", 2018. URL: https://www.youtube.com/watch?v=peX81PahND0, Downloaded Dec. 16, 2020.

* cited by examiner

METHOD FOR CHARGING BATTERY PACKS FOR POWER TOOLS AND CHARGING DEVICE FOR CARRYING OUT THE METHOD

FIELD

The present invention relates to a method for charging battery packs for power tools and a charging device for carrying out the method.

BACKGROUND INFORMATION

Contemporary battery packs for power tools typically contain lithium-ion cells (Li-ion), which are generally charged using typical charging devices in a so-called CCCV method (Constant Current Constant Voltage). A charging electronics unit of the charging device generates a constant charge current through the battery pack (CC phase), so that the battery voltage increases. As soon as the maximum battery voltage is reached, it is kept constant by the charging electronics unit (CV phase) and the charge current is reduced. If a predefined minimum value of the charge current is reached, the charging electronics unit ends the charging process and the battery cells are fully charged. The transition from the CC phase to the CV phase typically takes place at a state of charge of approximately 80%. In the case of high charge currents, CC phase and CV phase are approximately of equal length. Therefore, the time spans until a battery pack is charged to approximately 80% and until the battery pack has been charged by the remaining 20% to 100% also have nearly equal length.

In general, the required charging parameters for charging battery packs for power tools are permanently programmed in the charging electronics unit of the charging devices. The parameters which the manufacturer considers to be optimal for the average usage of the battery packs are thus typically used for every charging device and every battery pack. These parameters are adapted by the charging electronics unit of the charging device to the particular battery pack used. This is usually carried out via a coding (for example, with the aid of a coding resistor) of the battery pack, which the charging electronics unit of the charging device may recognize, or via a communication interface (for example, a BUS communication between battery pack and charging device).

Due to the development of the lithium-ion technology, it is possible to operate more and more different applications and products using lithium-ion battery packs and cells. The expectations for charging time, energy, and service life may vary widely due to the variety of the products and applications. The optimization of the service life, however, is often in opposition to the optimization of the charging time or charged capacity, that is to say, the energy which is available after the charging in the battery pack or battery cells.

A charging device for an energy store, in particular for a lithium-ion battery in an electric vehicle, is described in PCT Application No. WO 2011/018335 A2, the charging device including a circuit for setting the charging device to a full charging mode and a parked charging mode. The charging device is configured to produce a full state of charge of the energy store in the full charging mode and to produce a parked state of charge of the energy store in the parked charging mode, the parked state of charge corresponding to a reduced state of charge of the energy store.

Furthermore, a charging device is described in PCT Application No. WO 2012/069690 A1, using which batteries may be completely charged via CCCV methods in different charging modes each having different time windows. In this way, it is possible to charge the batteries either particularly quickly or gently.

Power tools of a voltage class may have very different properties, for example, a high power requirement for a short running time or a low power requirement in the case of a longer running time. Furthermore, these power tools may be used in companies by many users having very different requirement profiles, so that accordingly different requirements result for the battery packs supplying the power tools and their charging parameters.

SUMMARY

It is an object of the present invention to further optimize the charging parameters of battery packs for power tools with respect to the various properties, for example the charging time, the charging capacity (and thus the running time in a power tool), or the service life of the battery packs or the battery cells (in usage or in storage) compared to the related art and to adapt them to the particular situation in order to enable the best possible usage of the battery packs for different applications of the power tools.

The present invention relates to a method for charging battery packs for power tools with the aid of a charging device, the charging device having a first charging mode, in which the battery packs are charged up to a defined state of charge using a constant current and subsequently using a constant voltage. It is provided according to an example embodiment of the present invention that at least one second charging mode is settable by a user, in which the battery packs are exclusively only partially charged using a constant current up to a charge limit. In this way, the charging parameters may particularly advantageously be adapted to the particular situation in order to enable an optimal use of the battery packs, so that the charging time, the charged capacity, or the running time may be deliberately optimized in conjunction with the power tool and the service life of the battery packs or battery cells.

On the one hand, any device for machining workpieces with the aid of an electrically driven insert tool is to be understood as a battery-operated "power tool." The power tool may thus be understood as a handheld power tool or as a stationary power tool. Typical power tools in this context are hand-held or standing drills, screwdrivers, impact drills, planers, angle grinders, orbital sanders, polishing machines, or the like. However, gardening tools such as lawn trimmers, pruning saws, or the like may also be subsumed under the term power tool. Furthermore, devices which are typically used on construction sites may be understood as power tools. Examples of this are fans, pumps, mixing machines, etc.

The battery packs for power tools described here are preferably designed as exchangeable battery packs and include a housing, which is detachably connectable in a friction-locked and/or form-fitting manner to the power tool or the charging device via a mechanical interface. Furthermore, the battery pack includes at least one battery cell and an electrical interface, via which the at least one battery cell is electrically connectable to the power tool or the charging device. The battery cell may be designed as a galvanic cell, which has a structure in which one cell pole comes to rest at one end and a further cell pole comes to rest at an opposite end. In particular, the battery cell has a positive cell pole at one end and a negative cell pole at an opposite end. The battery cells are preferably designed as lithium-based battery cells, for example lithium-ion, lithium-polymer, or the like.

The present invention is also applicable to nickel-cadmium cells, nickel-metal hydride cells, or other suitable types of cells. The battery voltage of the battery pack is generally a multiple of the voltage of a single battery cell and results from the interconnection (in parallel or series) of the battery cells. In the case of typical lithium-ion battery cells having a voltage of 3.6 V, exemplary battery voltages of 3.6 V, 7.2 V, 10.8 V, 14.4 V, 18 V, 36 V, etc, thus result. The battery cell is preferably designed as an at least essentially cylindrical round cell, the cell poles being situated at the ends of the cylinder shape. The electrical interface in particular includes at least two electrical contact elements which are designed to transmit energy. Alternatively, the electrical interface may also include a secondary charging coil element for inductive charging, however. In addition, the electrical interface may include further contact elements that are designed to transmit pieces of information, which are preferably ascertained via an electronic unit integrated into the battery pack, to the power tool and/or to the charging device. This information may relate, for example, to a state of charge of the battery pack, a temperature inside the battery pack, a coding, or a residual capacity of the battery pack.

It is to be noted that the present invention is not restricted to exchangeable battery packs, but rather is also usable without restriction for power tools having permanently integrated battery cells. The term battery pack is therefore to be understood as a synonym for exchangeable battery packs for power tools and also for power tools having permanently integrated battery cells. Furthermore, plugging in the battery pack or the power tool is also to be understood as insertion, introduction, or a comparable connecting procedure.

The term "charge limit" is to define a target value of the charging capacity of a battery pack up to which the battery pack is to be charged. Upon reaching the charge limit, the battery pack is not charged further and the charging device automatically ends the particular charging process of the set charging mode.

In accordance with an example embodiment of the present invention, it is provided that the charging device also has further charging modes in addition to the first and the second charging mode, in the further charging modes the battery packs only being partially charged using the constant current up to different charging limits in each case. Since each charging mode has a separate charging parameter set, an optimization of the charging time, the charged capacity, and the service life of the battery pack to be charged, on the one hand, and the running time of the power tool and the energy provided for it, on the other hand, for the particular specific usage case is thus advantageously possible on the basis of the selected charging method.

Moreover, special charging modes enable reaching a precise state of charge, the respective charge limits of the second and/or the further charging modes being settable by the user.

Furthermore, in accordance with an example embodiment of the present invention, it is provided that the user may select between a total of five different charging modes. A differentiation is to be made between a "standard" mode (in general the CCCV charging method), a "boost" mode using increased charge current and very short charging time, a "long life" mode using particularly low charge current and very long charging time, a "storage" mode using a low charge current and extended charging time, and a "flight" mode using a charge current and a charging time corresponding to the "storage" mode, but are differentiated by a reduced charging limit in comparison thereto, full charging of the battery pack only taking place in the "standard" mode.

The first charging mode according to the CCCV charging method is advantageously defined as the standard which is automatically selected when the charging device is switched on, after a battery pack is inserted into the charging device, and/or after the charging process of the battery pack is ended. In this way, it is possible to prevent the battery packs of different users from being charged to states of charge which are disadvantageous for them. Alternatively, however, the user may also define one of the charging modes as a standard which is automatically selected when the charging device is switched on, after a battery pack is inserted into the charging device, and/or after the charging process of the battery pack is ended. The latter is particularly advantageous for users who have to charge a larger number of battery packs to a precise state of charge for the purpose of transport or storage or who use the battery packs for a specific purpose and are always in a similar situation.

In order to be able to bring the charging device into a defined starting state again and again, it is provided that the user may reset the charging device into the first charging mode via a reset function.

If a battery pack is to be charged, whose state of charge is above the charge limit of the selected charging mode, the charging device outputs a visual, acoustic, and/or haptic error message in order to warn the user accordingly. It is advantageous if the charging device gives the user feedback that the selected charging mode is not executable. Such an error message may take place, for example, via an LED indicator (for example by a red flashing), via a warning tone, and/or via a display or via a radio interface (e.g., Bluetooth, WLAN, or the like).

Furthermore, it is possible that the charging device discharges a plugged-in battery pack to the charge limit of the selected charging mode if the state of charge of the battery pack is above the charge limit. Using this function, charging modes such as the "storage" mode or the "flight" mode may be executed automatically upon plugging in independently of the state of charge of the battery pack.

An example embodiment of the present invention provides a charging device for carrying out the method according to the present invention, the charging device including an operating unit which is used to switch over the charging mode. Such an operating unit may preferably be designed as one or multiple push buttons that are located directly on the charging device. Moreover, it is provided that the charging device includes an indicator for indicating the present charging mode. Such an indicator may be designed, for example, as an LED indicator, as a touch-sensitive or non-touch-sensitive display (LCD, TFT, OLED, E-paper, etc.), or also as a loudspeaker or buzzer or a vibration actuator. Moreover, it is possible that the information about the present charging mode is output in addition to further charging parameters and states of charge via an interface to an external device, for example, a smart phone, a tablet, a remote control, a PC, a laptop, or the like. The indicator may be designed as part of the operating unit in order to thus keep the installation space as small as possible. The buttons may thus be designed, for example, directly as light-emitting elements, in order to indicate directly to the user which charging mode he/she has selected.

Via an interface, which—as already mentioned—may be designed as a radio interface, it is particularly advantageously possible for the user to switch the charging mode with the aid of the external device. Furthermore, the user may define one of the charging modes as the standard via the interface and/or the operating unit of the charging device. The charging device may also be reset to the factory status via the operating unit and/or the interface. For this purpose, it includes a control unit having a corresponding reset function.

BRIEF DESCRIPTION OF THE DRAWINGS

The present invention is explained hereinafter by way of example on the basis of FIGS. 1 through 4, identical reference numerals in the figures indicating identical components having an identical function.

DETAILED DESCRIPTION OF EXAMPLE EMBODIMENTS

Figure 1:
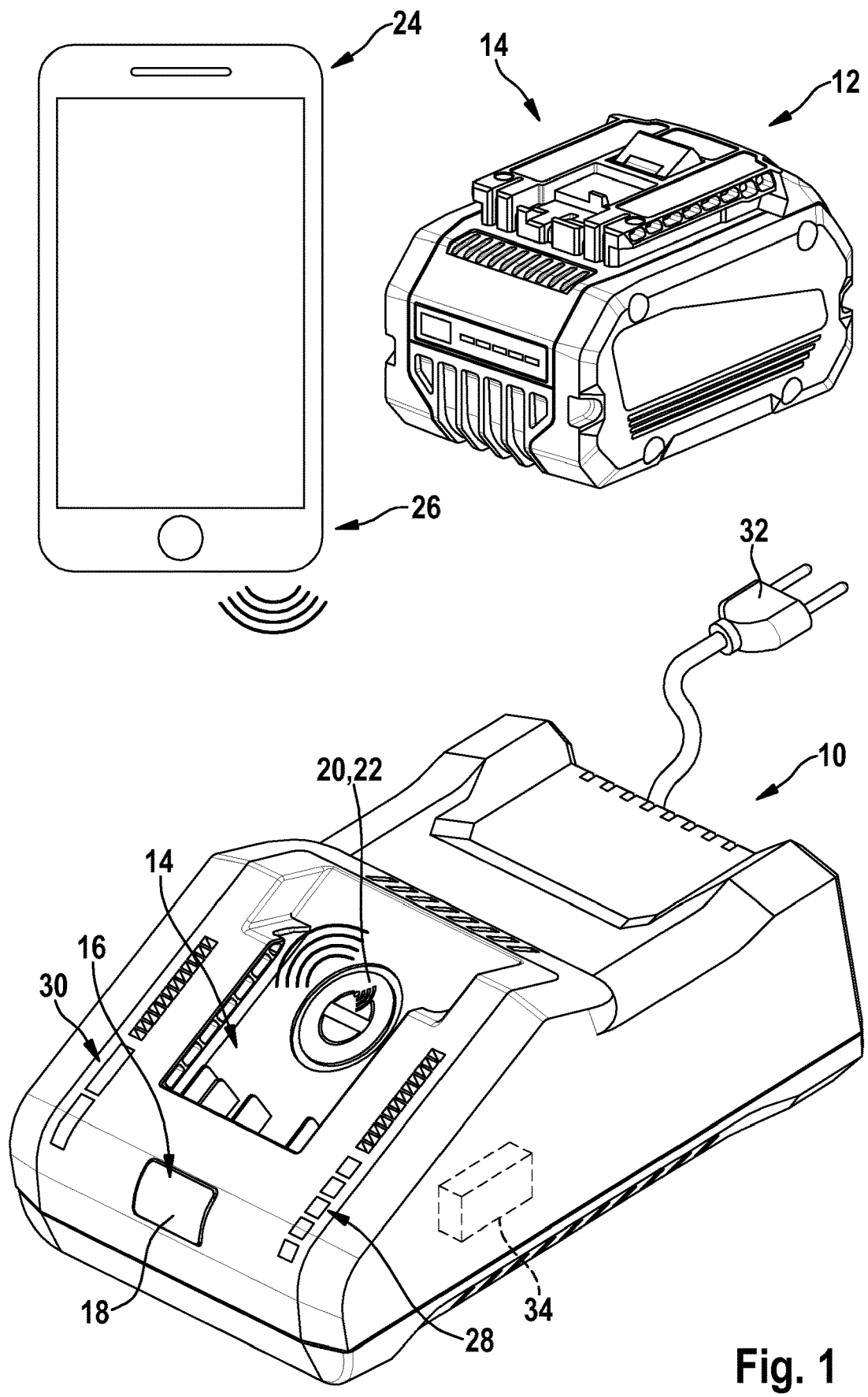
FIG. 1 shows a charging device according to an example embodiment of the present invention for charging an exchangeable battery pack.

FIG. 1 shows a charging device 10 for charging an exchangeable battery pack 12 for a power tool (not shown). The use of exchangeable battery packs for different power tools is conventional, so that it will not be discussed in greater detail here. Corresponding power tools having permanently integrated battery cells are also conventional. The design of electromechanical interfaces 14 of battery pack, charging device, and power tool for the electrical supply of the power tool, on the one hand, and for charging battery pack 12 with the aid of charging device 10, on the other hand, is also conventional, so that it will not be discussed in greater detail here, particularly because it has no further importance for the present invention. Further, it is to be noted that the present invention is also applicable without restriction to wirelessly, in particular inductively, operating charging devices and battery packs.

To charge battery pack 12, it is plugged, using its electromechanical interface 14, into corresponding electromechanical interface 14 of charging device 10, so that an energy transmission takes place from charging device 10 to battery pack 12. At the same time, data with respect to the charging parameters, such as temperature, state of charge, residual capacity, and the like may be transmitted via electromechanical interfaces 14.

It is possible for a user to switch between different charging modes M1, . . . , M5 at charging device 10 with the aid of an operating unit 16. A more detailed description of individual charging modes M1, . . . , M5 and the design of operating unit 16 is discussed in greater detail in FIGS. 2 through 4. Furthermore, operating unit 16 is used as an indicator 18 of presently set charging mode M1, . . . , M5 via one or multiple LEDs and/or a display having different colors and/or flashing frequencies. Via an interface 20 which—as already mentioned—may be designed as a radio interface 22 (e.g., Bluetooth, WLAN, NFC, Zigbee, LoRa, GSM, UMTS, or the like) or also as a hard-wired interface (e.g., USB, Ethernet, Thunderbolt, Lightning, RS232, or the like), it is alternatively or additionally possible for the user to switch charging mode M1, . . . , M5 with the aid of an external device 24 (e.g., smart phone, tablet, PC, remote control, etc.) having corresponding counter interface 26. Furthermore, the user receives feedback on external device 24 about presently set charging mode M1, . . . , M5 with the aid of interfaces 20, 22, 26.

Charging device 10 furthermore has a state of charge indicator 28, which is divided into multiple indicator segments for different state of charge ranges (e.g., <=20%, <=40%, <=60%, <=80%, <=100%). The user may thus recognize the state of charge of plugged-in battery pack 12 quickly and easily. State of charge indicator 28 may be designed in such a way that in each case all segments are used to display presently set charging mode M1, . . . , M5. However, it is alternatively also possible that the segments always refer to the full state of charge of battery pack 12 to be charged, the end of a charging process of presently set charging mode M1, . . . , M5 then being indicated by flashing or a different color of individual or multiple segments up to present charge limit G. Using a status indicator 30, charging device 10 may signal possible errors in charging device 10 and/or in battery pack 12 to the user, for example an excessive temperature or a critical abortion of the charging process. Indicators 18, 28, 30 may be implemented by single-color or multicolored LEDs, by LCD elements, or the like. Additionally or alternatively, individual or all indicators 18, 28, 30 may be designed as acoustic and/or haptic signal generators. For example, a loudspeaker, in particular a piezoelectric loudspeaker, comes into consideration as an acoustic signal generator and a vibration generator in the form of an electric motor having an unbalanced disk driven thereby comes into consideration as a haptic signal generator.

The user may define one of charging modes M1, . . . , M5 as a standard via interface 20 and/or operating unit 16 of charging device 10. The selected standard charging mode is then automatically selected, for example, upon starting of charging device 10 or upon plugging of a power plug 32 of charging device 10 into a socket. After the end of a charging process, when battery pack 12 is fully charged and/or the user removes battery pack 12 from charging device 10, charging device 10 also switches on the standard charging mode again.

It is possible to reset charging device 10 into a factory status with the aid of interface 20 and/or operating unit 16. For this purpose, charging device 10 includes a control unit 32, for example in the form of a microprocessor (not shown but is conventional), having a corresponding reset function which reacts to actuation of operating unit 16. It is possible, for example, that the user has to actuate operating unit 16 over a longer time period of 5 seconds with the aid of a press of a button to reset charging device 10. Alternatively or additionally, the user may reset charging device 10 via an app installed on external device 24. Charging device 10 thereafter starts again with first charging mode M1. A setting of the standard charging mode may also be implemented via a longer press of a button of, for example, 2 seconds and/or with the aid of the app, so that presently set charging mode M1, . . . , M5 is taken over directly as the standard.

Furthermore, the user may specify a charging mode M1, . . . , M5 temporarily until the disconnection of the mains supply, until the shutdown of charging device 10, and/or until the reset of charging device 10, which starts automatically upon the insertion of a battery pack 12. This is particularly advantageous for users who use battery packs for a specific purpose and are always in a similar situation.

It may also be provided that individual charging modes M1, . . . , M5 are blocked temporarily by the user by a double press of the button of operating unit 16 and/or with the aid of external device 24, in order to prevent inadvertent selection.

In FIG. 2, different charging modes M1 (FIG. 2a), M2 (FIG. 2b), M3 (FIG. 2c), M4 (FIG. 2d), and M5 (FIG. 2e) of charging device 10 are plotted as diagrams of charge current curve I over time t or charging capacity C.

Figure 2A:
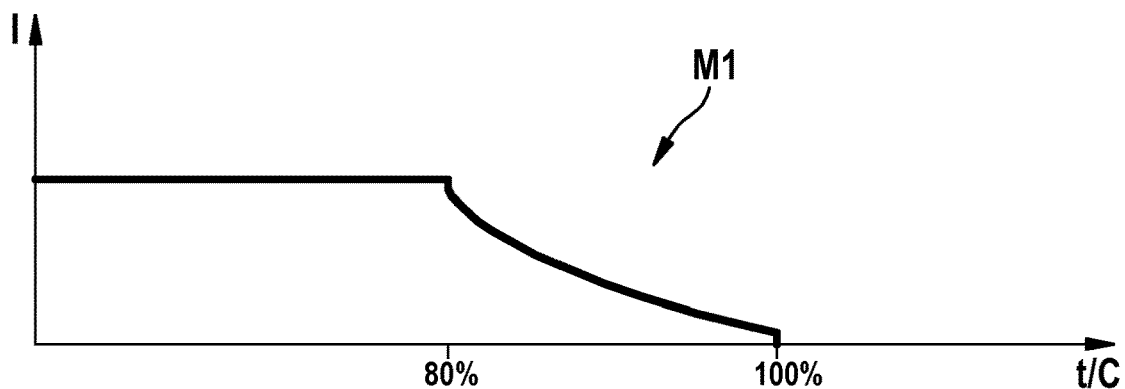
FIG. 2 shows diagrams of a standard charging mode according to the CCCV charging method and four further charging modes according to the CC charging method according to an example embodiment of the present invention.

In "standard" mode M1 according to FIG. 2a, battery pack 12 is charged according to the CCCV charging method. The charging process initially takes place using constant charge current I (constant current—CC) up to approximately 80% of the maximum charging capacity and from 80% up to the full charging capacity using constant charging voltage (constant voltage-CV) and nonlinearly dropping charge current I. This mode represents the best compromise between charging time, charged capacity, and service life of battery pack 12 or its battery cells.

Figure 2B:
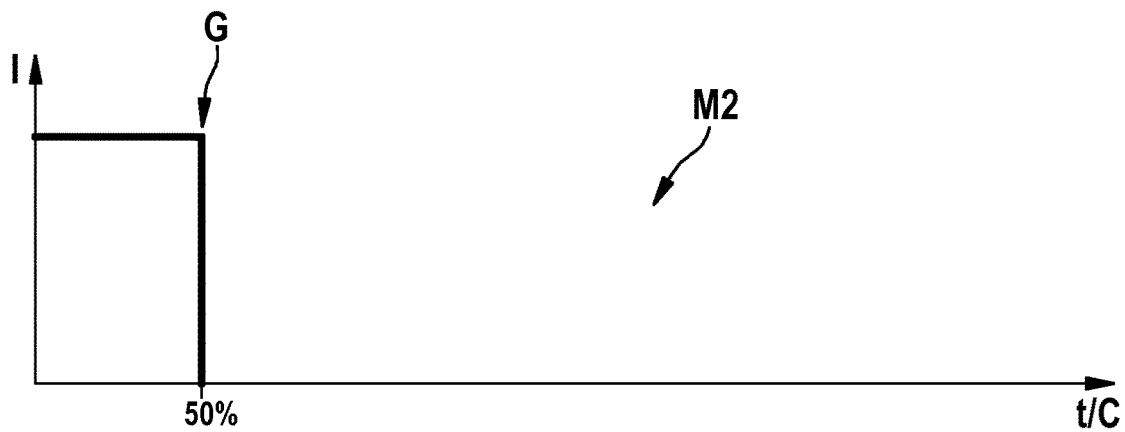

FIG. 2b shows "boost" mode M2, in which battery pack 12 is charged in a very short time using a higher constant charge current I (CC) than in "standard" mode M1. However, lithium-ion cells may only be charged at low charge using increased charge current. Therefore, battery pack 12 is only charged up to a charge limit G of approximately 50% of its charging capacity in this mode. Furthermore, it is possible to vary charge current I in multiple steps between 0 and 50% (step charging), charge current I being kept constant within each step. The "boost" mode permits the user to charge sufficient energy into battery pack 12 in a time t significantly shortened in relation to other charging modes M1, M3, M4, M5, in order to carry out limited work shortly, for example, drilling a limited number of drilled holes using a drill, sawing a limited number of boards using a jigsaw, mowing a small lawn using a lawnmower, or comparable applications.

Figure 2C:
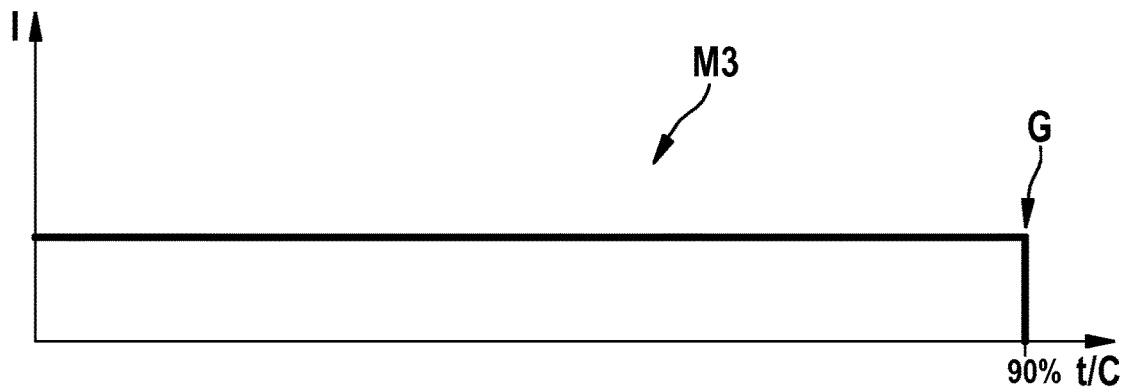

In "long life" mode M3 according to FIG. 2c, battery pack 12 is charged using charge current I reduced in comparison to "boost" mode M2 and the CC phase of "standard" mode M1 over a long time period to a charge limit G of approximately 90% of its maximum charging capacity. For this purpose, the charging of battery pack 12 only takes place up to a reduced charging voltage. This charging mode is very gentle for the battery cells and permits an extension of their service life in particular in comparison to charging modes M1 and M2. "Long life" charging mode M3 is particularly useful for users who do not require the complete energy of battery pack 12 during a work unit (for example, a workday) and do not have a particular requirement for the charging time (for example, charging overnight).

Figure 2D:
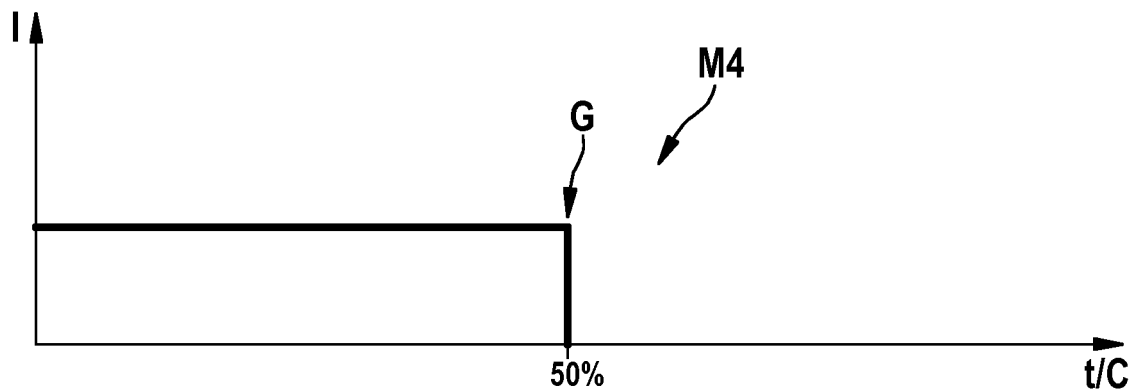

FIG. 2d shows "storage" mode M4. In this mode, battery pack 12 is charged using a charge current I comparable to "long life" mode M3, the charging voltage being significantly reduced so that only approximately 50% of the charging capacity is reached. "Storage" mode M4 permits the user to bring battery pack 12 into a state in which it may be optimally stored with maximum service life. This is of particular interest, for example, for users who wish to store their battery packs over a longer time period (for example, 6 months or more), without using them.

Figure 2E:
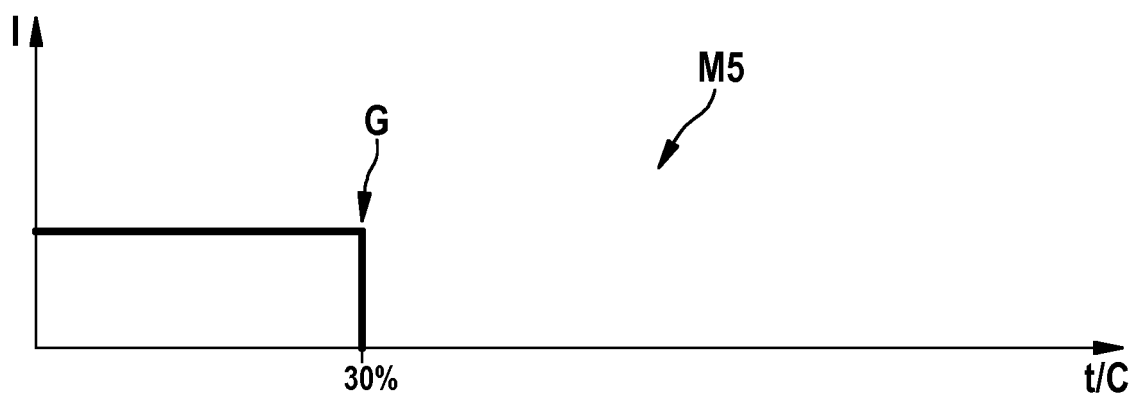

"Flight" mode M5 according to FIG. 2e is essentially comparable to "storage" mode M4. However, the battery packs are only charged here up to a charge limit G of approximately 30% of their maximum charging capacity, so that they may be transported safely via air freight according to the IATA regulations.

Individual charging scenarios for different requirements and users may thus be implemented very easily and quickly via different charging modes M1 through M5. It may be provided that charging device 10 proposes and/or automatically carries out further steps for the user as a function of present charging state M1, . . . , M5 of plugged-in battery pack 12. For example, if a battery pack 12 is plugged in having a state of charge which is below charge limit G of selected charging mode M1, . . . , M5, charging device 10 thus charges battery pack 12 up to charge limit G directly after it is plugged in.

In contrast, if a battery pack 12 is plugged in having a state of charge which is above charge limit G of presently set charging mode M1, . . . , M5, charging device 10 gives the user a visual, acoustic, and/or haptic feedback, according to which selected charging mode M1, . . . , M5 is not executable. Such feedback may take place via one of indicators 18, 28, 30 with the aid of a tone and/or a vibration. Additionally or alternatively, it is also possible to send the feedback via interface 14 to an app installed on external device 24.

However, it may also be predefined by the user via the app of external device 24 or directly at charging device 10 that a plugged-in battery pack 12, whose state of charge is above charge limit G, is automatically discharged down to charge limit G via a discharge circuit of charging device 10 after being plugged in. Using this function, charging modes such as "storage" mode M4 or "flight" mode M5 may be carried out easily, independently of the state of charge upon plugging in. This variant is particularly advantageous for users who have to prepare a large quantity of battery packs 12 for a precise state of charge for shipping or storage. Moreover, it is possible to vary charge limits G of individual charging modes M1, . . . , M5 in predefined ranges via the app of external device 24.

Figure 3:
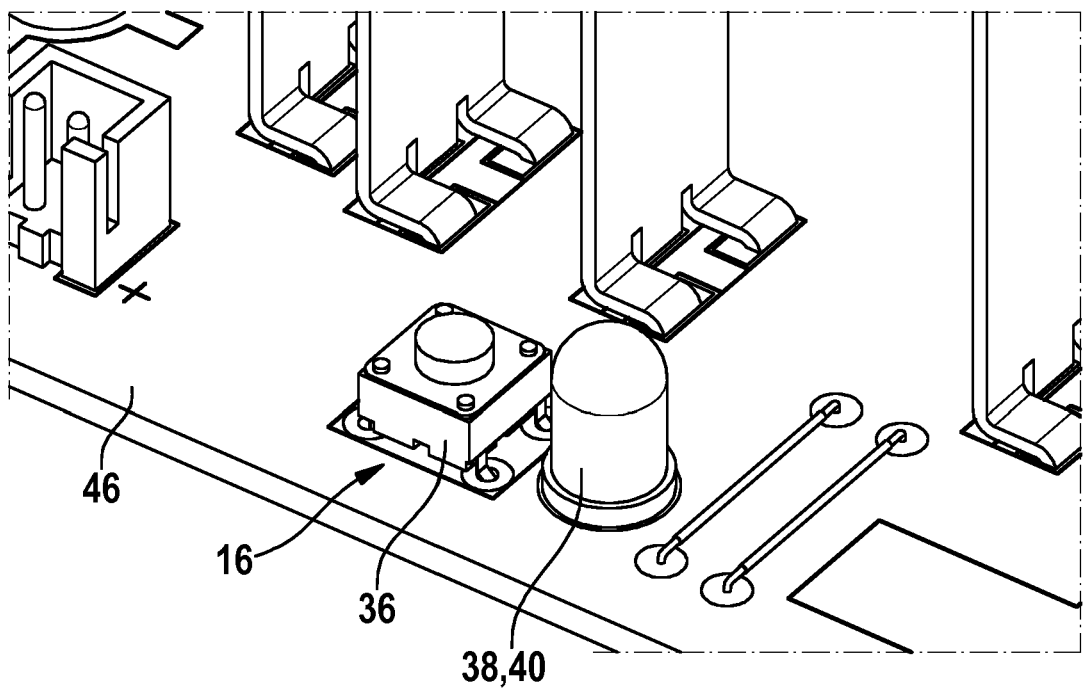
FIG. 3 shows a detail view of an operating unit and a display element of the charging device for switching the charging mode and for displaying the present charging mode, in accordance with an example embodiment of the present invention.
Figure 4:
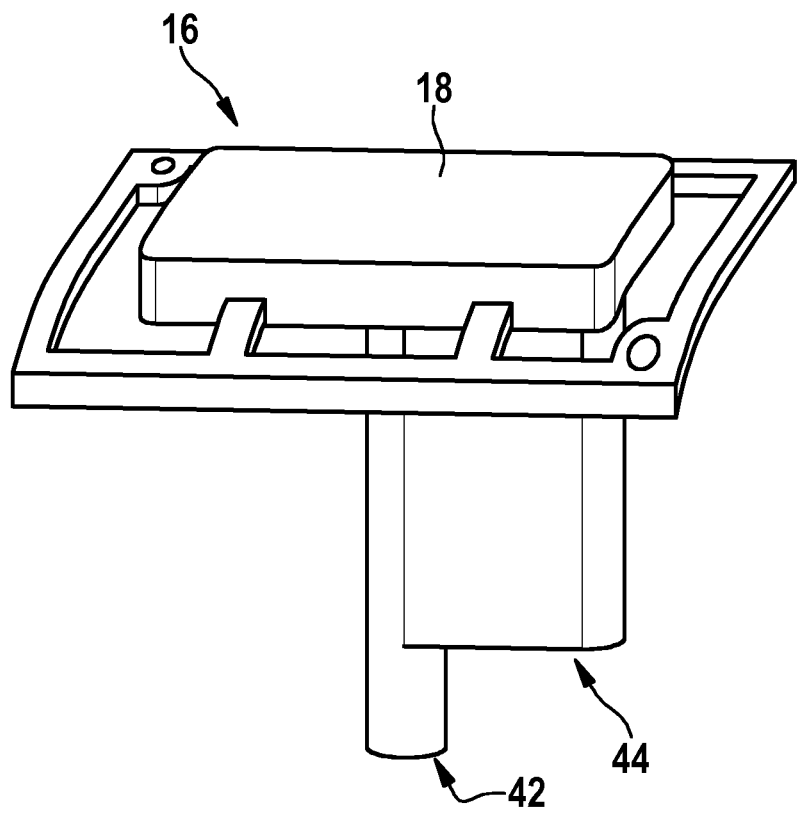
FIG. 4 shows a schematic illustration of an actuating element according to an example embodiment of the present invention of the operating unit in a detail view.

A detail view of operating unit 16 is shown in FIGS. 3 and 4. Operating unit 16 includes a push button 36 in the form of a microswitch, an illuminant 40 designed as an LED 38, and an actuating element 42 preferably made up of transparent plastic, which is used at the same time as light transport element 44 for display 18. Push button 36 and illuminant 38 are situated adjacent to one another on a circuit board 46 in such a way that the user directly receives feedback in the form of lighting up of indicator 18 used as the actuating surface via light transport element 44 upon an actuation of push button 36 with the aid of actuating element 42, in order to directly indicate selected charging mode M1, . . . , M5 to him/her.

Indicator 18 of operating unit 16 may alternatively also be designed as a touch-sensitive or non-touch-sensitive display, in order to complete the above functions.

In the above-described way, the reset function, the setting of the standard charging mode, and the blocking of individual charging modes may also be implemented via operating unit 16 or push button 36 operationally connected thereto. However, it is also possible to implement the reset function by way of a push button situated sunk-in in charging device 10, which may only be actuated with the aid of a tool (paperclip, ballpoint pen, etc.).

Finally, it is to be noted that the exemplary embodiment shown is not restricted to FIGS. 1 through 4 or to the shapes and arrangements shown therein of operating unit 16 and indicators 18, 28, 30.

What is claimed is:

1. A method for charging a battery pack for a power tool using a charging device, the charging device having a first charging mode, in which the battery pack is charged up to a defined state of charge using a constant current and subsequently using a constant voltage, the charging device further having at least one second charging mode which is settable via a user interface by a user, the method comprising:

setting, by the user via the user interface, the second charging mode; and in the second charging mode, only partially charging the battery pack up to a charge limit exclusively using a constant current, wherein the constant current of the second charging mode is higher than the constant current of the first charging mode, wherein the charge limit of the second charging mode is smaller than the charge limit of the first charging mode, wherein the charge limit defines a target value of the charging capacity of the battery pack up to which the battery pack is to be charged.

2. The method as recited in claim 1, wherein the charging device has further charging modes in addition to the first charging mode and the second charging mode, and wherein, in the further charging modes, the battery pack is only partially charged up to different charging limits in each case using constant current, depending on a selected one of the further charging modes.

3. The method as recited in claim 2, wherein the charge limit is settable in the second and/or in one of the further charging modes.

4. The method as recited in claim 2, wherein the user may select between a total of five different charging modes.

5. The method as recited in claim 4, wherein the charging device outputs an visual, and/or acoustic, and/or haptic error message, when the battery pack is to be charged, whose state of charge is above the charge limit of the selected charging mode.

6. The method as recited in claim 2, wherein the user may reset the charging device into the first charging mode via a reset function.

7. A method for charging a battery pack for a power tool using a charging device, the charging device having a first charging mode, in which the battery pack is charged up to a defined state of charge using a constant current and subsequently using a constant voltage, the charging device further having at least one second charging mode which is settable, the method comprising:

setting, by the user, the second charging mode; and in the second charging mode, only partially charging the battery pack up to a charge limit exclusively using a constant current, wherein the charging device has further charging modes in addition to the first charging mode and the second charging mode, and wherein, in the further charging modes, the battery pack is only partially charged up to different charging limits in each case using constant current, depending on a selected one of the further charging modes, wherein the user may select between a total of five different charging modes, wherein the first charging mode is defined as a standard mode, which is automatically selected when the charging device is switched on, and/or after a battery pack of the battery packs is inserted into the charging device, and/or after a charging process of the battery pack is ended.

8. A method for charging a battery pack for a power tool using a charging device, the charging device having a first charging mode, in which the battery pack is charged up to a defined state of charge using a constant current and subsequently using a constant voltage, the charging device further having at least one second charging mode which is settable, the method comprising:

setting, by the user, the second charging mode; and in the second charging mode, only partially charging the battery pack up to a charge limit exclusively using a constant current, wherein the charging device has further charging modes in addition to the first charging mode and the second charging mode, and wherein, in the further charging modes, the battery pack is only partially charged up to different charging limits in each case using constant current, depending on a selected one of the further charging modes, wherein the user may define one of the first charging mode, the second charging mode, and further charging modes, as a standard mode, which is automatically selected when the charging device is switched on, and/or after a battery pack is inserted into the charging device, and/or after the charging process of the battery pack is ended.

9. A method for charging a battery pack for a power tool using a charging device, the charging device having a first charging mode, in which the battery pack is charged up to a defined state of charge using a constant current and subsequently using a constant voltage, the charging device further having at least one second charging mode which is settable, the method comprising:

setting, by the user, the second charging mode; and in the second charging mode, only partially charging the battery pack up to a charge limit exclusively using a constant current, wherein the charging device has further charging modes in addition to the first charging mode and the second charging mode, and wherein, in the further charging modes, the battery pack is only partially charged up to different charging limits in each case using constant current, depending on a selected one of the further charging modes, wherein the user may select between a total of five different charging modes, wherein the charging device discharges a plugged-in battery pack to the charge limit of the selected charging mode if the state of charge of the battery pack is above the charge limit.

10. A charging device for charging a battery pack for a power tool using a charging device, the charging device having a first charging mode, in which the battery pack is charged up to a defined state of charge using a constant current and subsequently using a constant voltage, the charging device further having at least one second charging mode which is settable by a user via a user interface, where in the second charging mode, the charging device is configured to only partially charge the battery pack up to a charge limit exclusively using a constant current, wherein the constant current of the second charging mode is higher than the constant current of the first charging mode, wherein the charge limit of the second charging mode is smaller than the charge limit of the first charging mode, the charging device comprising:

an operating unit for switching a charging mode of the charging device, wherein a button encompasses an indicator in a form of an illuminant to indicate a present charging mode, wherein the charge limit defines a target value of the charging capacity of the battery pack up to which the battery pack is to be charged.

11. The charging device as recited in claim 10, further comprising:
an indicator configured to indicate a present charging mode of the charging device.

12. The charging device as recited in claim 11, wherein the operating unit includes the indicator.

13. The charging device as recited in claim 10, wherein the charging device has further charging modes in addition to the first charging mode and the second charging mode, and wherein, in the further charging modes, the charging device is configured to only partially charge the battery pack up to different charging limits in each case using constant current, depending on a selected one of the further charging modes.

14. A charging device comprising:
an operating unit for switching a charging mode of the charging device, wherein the charging mode includes a first charging mode and a second charging mode; and
a radio interface configured to switch the charging mode and/or to indicate a present charging mode via an external device,
wherein the charge mode is based on at least one of a charging time of a battery pack associated with the charging device or a running time of a power tool associated with the charging device
wherein, in addition to the first and second charging modes, the charging device includes further charging modes, and wherein at least one of the first, second, and further charging modes is definable as a standard charging mode via the operating unit and/or the interface,
wherein the charging device includes a control unit having a reset function, which may be triggered via the operating unit and/or the interface, to reset the charging device to a factory status.

* * * * *